United States Patent [19]

Thacker et al.

[11] Patent Number: 5,301,283
[45] Date of Patent: Apr. 5, 1994

[54] DYNAMIC ARBITRATION FOR SYSTEM BUS CONTROL IN MULTIPROCESSOR DATA PROCESSING SYSTEM

[75] Inventors: Charles P. Thacker, Palo Alto, Calif.; David Hartwell, Boxboro, Mass.

[73] Assignee: Digital Equipment Corporation, Maynard, Mass.

[21] Appl. No.: 870,134

[22] Filed: Apr. 16, 1992

[51] Int. Cl.5 .................................... G06F 13/00
[52] U.S. Cl. .......................... 395/325; 364/DIG. 1;
364/230; 364/230.1; 364/230.2; 364/231.5;
364/232.9; 364/238.2; 364/239.9; 364/240;
364/241.2; 364/241.3; 364/241.4; 364/242.6;
364/242.7; 364/242.8; 364/242.9; 395/725
[58] Field of Search .................. 395/325, 725, 425;
370/85.6; 340/825.5

[56] References Cited

U.S. PATENT DOCUMENTS

| | | | |
|---|---|---|---|
| 3,593,300 | 7/1971 | Driscoll, Jr. | 395/650 |
| 3,925,766 | 12/1975 | Bardotti et al. | 395/725 |
| 3,983,540 | 9/1976 | Keller et al. | 395/325 |
| 4,001,984 | 1/1977 | Bardotti | 395/725 |
| 4,096,571 | 6/1978 | Vander Mey | 395/425 |
| 4,229,791 | 10/1980 | Levy et al. | 395/325 |
| 4,232,294 | 11/1980 | Burke et al. | 340/825.5 |
| 4,257,095 | 3/1981 | Nadir | 395/325 |
| 4,302,808 | 11/1981 | Zanchi et al. | 395/325 |
| 4,313,196 | 1/1982 | Oblonsky | 370/85.6 |
| 4,321,669 | 3/1982 | Macmillian | 395/325 |
| 4,451,881 | 5/1984 | Grice et al. | 395/325 |
| 4,467,418 | 8/1984 | Quinquis | 395/325 |
| 4,493,036 | 1/1985 | Boudreau et al. | 395/22 |
| 4,511,959 | 4/1985 | Nicolas et al. | 395/325 |
| 4,543,629 | 9/1985 | Carey et al. | 395/325 |
| 4,560,985 | 12/1985 | Strecker et al. | 340/825.5 |
| 4,628,447 | 12/1986 | Cartret et al. | 395/725 |
| 4,633,394 | 12/1986 | Georgiou et al. | 395/650 |
| 4,644,467 | 2/1987 | McCarthy | 395/725 |
| 4,748,586 | 5/1988 | Bonci | 395/725 |
| 4,755,938 | 7/1988 | Takahashi et al. | 395/725 |
| 4,785,394 | 11/1988 | Fischer | 395/325 |
| 4,787,033 | 11/1988 | Bomba et al. | 395/325 |
| 4,788,639 | 11/1988 | Tamaru | 395/725 |
| 4,802,087 | 1/1989 | Keeley et al. | 395/725 |
| 4,814,974 | 3/1989 | Narayanan et al. | 395/725 |
| 4,914,580 | 4/1990 | Jensen et al. | 395/325 |
| 4,920,486 | 4/1990 | Nielson | 395/325 |
| 4,926,418 | 5/1990 | Cidon et al. | 370/85.5 |
| 4,937,733 | 6/1990 | Gillett, Jr. et al. | 395/325 |
| 4,969,120 | 11/1990 | Azevedo et al. | 395/325 |
| 4,979,100 | 12/1990 | Makris et al. | 395/325 |
| 5,034,881 | 7/1991 | Hoashi et al. | 395/325 |
| 5,119,292 | 1/1992 | Baker et al. | 395/725 |
| 5,133,059 | 7/1992 | Ziegler et al. | 395/725 |
| 5,142,682 | 8/1992 | Lemay et al. | 395/725 |
| 5,150,358 | 9/1992 | Punj et al. | 370/84 |
| 5,155,854 | 10/1992 | Flynn et al. | 395/725 |
| 5,168,570 | 12/1992 | Eckert et al. | 395/725 |

Primary Examiner—Allen R. MacDonald
Assistant Examiner—Ayaz R. Sheikh
Attorney, Agent, or Firm—Cesari and McKenna

[57] ABSTRACT

In a data processing system having a plurality of commander nodes and at least one resource node interconnected by a system bus, a bus arbitration technique determines which commander node is to gain control of the system bus to access the resource node. The bus arbitration technique assigns priority levels to all commander nodes, with at least one commander node receiving more than one priority level. Each priority level has an associated signal path. During each arbitration, each contending commander node can activate or assert the signal path associated with its priority level, and the commander node having more than one priority level can assert the signal path associated with any one of its priority levels. All commander nodes monitor all the signal paths to determine the identity of the contending commander node that asserted the signal path associated with the highest priority level among those that were asserted, and, thus, the contending commander node that "won" the arbitration.

18 Claims, 12 Drawing Sheets

DYNAMIC ARBITRATION FOR SYSTEM BUS CONTROL IN MULTIPROCESSOR DATA PROCESSING SYSTEM

CROSS REFERENCE TO RELATED APPLICATIONS

This invention is related to co-pending, commonly assigned U.S. patent applications, Ser. No. 07/567,177, entitled "Apparatus and Method for Distributed Dynamic Priority Arbitration for Access to a Shared Resource," and filed Aug. 30, 1990; Ser. No. 07/870,448, entitled "Memory Bank Management and Arbitration in Multiprocessor Computer System," filed on Apr. 16, 1992, and Ser. No. 07/870,436, entitled "Dynamic Arbitration for System Bus Control in Multiprocessor Computer System," filed on Apr. 16, 1992. The disclosure of those applications are incorporated herein by reference.

FIELD OF THE INVENTION

This invention relates generally to a digital processing system having multiple devices interconnected by a system bus over which the devices communicate among themselves. More specifically, the invention pertains to an arbitration technique by which control of the system bus is awarded when two or more of the devices "desire" to initiate communication at the same time.

BACKGROUND OF THE INVENTION

A. Multiprocessor Computer

Typically, a multiprocessor data processing system has a number of devices, including multiple (i.e., two or more) processors, interconnected by a system bus for communication. The devices on the system bus can also include a number of memory modules, and one or more input/output (I/O) units, such as disk, tape or I/O bridge controllers. Each memory module includes at least one independently accessible memory bank. Depending on system configuration, a number of the I/O units can be connected directly to the system bus, and the rest can be connected to one or more I/O buses, which connect to the system bus via an I/O interface or adapter.

Essentially, the memory banks serve as shared resources for the processors and I/O units, and therefore can be called "resource nodes" on the system bus. The processors and I/O units can be called "commander nodes." The commander nodes initiate requests to gain control of the system bus to access the memory banks. Essentially, the system bus can be viewed as a shared resource used by the commander nodes to access the resource nodes. Upon gaining control of the system bus, the commander nodes transmit commands (e.g., read or write) over the system bus, to which the resource nodes respond.

In a known data processing system, the commander nodes transmit the requests and commands in synchronization with system bus cycles. The bus cycles specify periodically occurring times for transmitting requests, for transmitting commands and for transmitting data over the system bus. During the system bus cycles, the times when requests can be transmitted are called "request cycles." Each commander node desiring bus access transmits a request during one of the request cycles, typically during the next-occurring request cycle.

B. Arbitration Mechanisms; Fixed and Variable Priority Levels

When two or more commander nodes request control of the system bus during the same request cycle, the computer employs bus arbitration to determine which of the requesting commander nodes is to gain bus control. Control is granted to or taken by the requesting commander node that wins the arbitration.

In known bus arbitration techniques, each commander node typically is assigned a unique priority level. An arbitration mechanism compares the priority levels of all devices that request control of the system bus during the same request cycle, and the device with the highest priority among those gains control of the bus.

Generally speaking, data processing systems use either central or distributed arbitration mechanisms. In central arbitration, a single, central priority device, frequently called an "arbiter," receives all access requests during each request cycle, determines which of the requesting commander nodes has the highest priority, and grants that node bus access. Central arbitration typically requires gate-intensive support logic for the arbiter and an exchange of signals between the arbiter and the commander nodes to effect the arbitration. Consequently, central arbitration is less economical than known distributive mechanisms in terms of system design, expense and overhead.

By contrast, in distributed arbitration, each requesting commander node determines for itself whether it has won arbitration, i.e., whether it has sufficient priority to obtain control of the system bus when it desires to do so. There is no central arbiter. If another commander node of higher priority simultaneously seeks bus access, the other node will win the arbitration, and the requesting node(s) of lower priority must wait until the next request cycle to again seek bus access by transmitting another request. Advantageously, distributive arbitration provides flexibility in system configuration, and affords some speed advantage because no time is spent waiting for a central arbiter to communicate its results to the various commander nodes.

Some arbitration schemes assign a fixed and unchanging priority to each commander node. It follows by virtue of such a scheme that the priority level of a particular commander node will always be higher or always be lower than that of certain other nodes, and that the node with the highest-priority level is assured of winning the arbitration each time it transmits a request. Consequently, the highest-priority node can monopolize the system bus by winning consecutive arbitrations, thereby "locking-out" other nodes from gaining access to the bus. Node lock-out, which is sometimes called "node starvation," can have significant consequences, particularly when the system is configured to give a high priority to a device that requires relatively frequent access to the system bus.

To provide "fairer" access to the system bus, and avoid node lock-out, other data processing systems use variable-priority arbitration techniques. In such systems, a requesting node having a higher priority than another during one arbitration may have a lower priority than the other during another arbitration.

An example of variable-priority arbitration is the so-called "dual-count" or "round robin" arbitration technique. The term "dual-count" arises from the fact that each node can arbitrate at either of two priority levels. More specifically, each node has an associated priority level in a high-priority group of levels and one in a low-priority group. A requesting node chooses which of its two levels to use in a given arbitration such that each node requesting the system bus obtains bus access once before any other node obtains control for a second time. To accomplish this, the arbitrating node bases its choice of priority levels on the identity of the node that previously had control of the bus. Then, if a node's possible priority levels are lower than the corresponding priority levels of the previous "master," it arbitrates at its higher priority level; otherwise, it arbitrates at its lower priority level. The node "knows" the identity of the previous master by, e.g., monitoring the arbitration by which the masters obtain bus control. Systems employing round-robin arbitration schemes of this type are described in U.S. Pat. Nos. 4,560,985 and 4,787,033.

Such round-robin arbitration mechanisms provide a degree of "fairness" in access to the system bus by the commander nodes—but only those that are equally situated. There are inherent differences between commander nodes that make equal treatment during arbitration unfair.

For instance, in the configuration described above, an I/O interface connects several I/O buses and thus, possibly, many I/O units to the system bus. Whenever the I/O interface loses an arbitration on the system bus, all requests for access to the resource nodes from those I/O units are denied, and each must await a next system-bus request cycle. Consequently, whenever the I/O interface loses the system-bus arbitration, data latency increases for the I/O units connected through the I/O interface.

Moreover, by virtue of the relatively lengthy, bus-to-bus route for communications via the I/O interface, latency for I/O units on the I/O buses will generally be longer than for commander nodes connected directly to the system bus, all the more so if the I/O buses are slower in byte transfer rate than the system bus. This, in turn, can significantly reduce I/O throughput and, often, overall system efficiency.

Thus, it would be desirable to afford the I/O interface with preferential treatment in gaining control of the system bus. However, considering the possibly high frequency of transfers by the I/O interface over the system bus, merely assigning the I/O interface a high priority could result in the other nodes of lower priority being denied access to the system bus and, thus, suffering node starvation.

It would be desirable to provide a more equitable "fairness," which takes into account the peculiar nature and situation of I/O interfaces, while preferably assuring that the other commander nodes share access to the system bus in equal measure.

SUMMARY OF THE INVENTION

The invention resides in a bus arbitration technique, which assigns priority levels to all commander nodes, with at least one commander node receiving more than one priority level. Each priority level has an associated signal conductor. During each arbitration, each contending commander node can activate or assert the signal conductor associated with its priority level, and the commander node having more than one priority level can assert the signal conductor associated with any one of its priority levels.

All commander nodes monitor all the signal conductors to determine the identity of the contending commander nod that asserted the signal conductor associated with the highest priority level among those that were asserted, and, thus, the contending commander node that "won" the arbitration.

More specifically, the arbitration technique utilizes a first priority scheme for some nodes, and a second, separate priority scheme for a number of other nodes. Preferably, the first priority scheme is a varying priority scheme used by what are called the "system" commander nodes, and the second priority scheme is a dualpriority scheme used by, e.g., the I/O interface. The system commander nodes include, e.g., the CPU's and I/O units connected directly to the system bus, but not the I/O interface.

In accordance with the varying priority scheme, the system commander nodes effectively share a set of priority levels; each is associated with one of the priority levels at any given time. The number of priority levels in the shared set preferably equals the number of system commander nodes that can be connected to the system bus. After each arbitration in which a system commander node has participated, the priority values of selected system commander nodes can change, but remain within the shared set of priority levels.

More specifically, upon one of the system commander nodes winning an arbitration, the arbitration unit associated with that winning node assumes the lowest priority level of the set of priority levels accorded the system commander nodes for the following arbitration. Moreover, the arbitration apparatus associated with each system commander node that had a priority level lower than the winning system commander node during that first arbitration assumes the next higher priority level during the following arbitration, regardless of whether those system commander nodes participated in the first arbitration. Any system commander node that had a higher priority level than the winning system commander node during the first arbitration retains that same priority level for the following one.

In accordance with the dual-priority scheme, the I/O interface has two specific priority levels: a "highest" priority level, which is higher than all of the shared set of priority values of the system commander nodes, and a "lowest" priority level, which is lower than all of the shared set of priority levels of the system commander nodes. The I/O interface selects one of the two priority levels to use in each arbitration., e.g., in a recurring pattern or selected priority levels, or based on the history of priority selections in a number of previous arbitrations.

Accordingly, the invention can be implemented in a distributed arbitration arrangement, which provides a more equitable "fairness" than in known prior art systems because it takes into account the peculiar nature and situation of I/O interface, while assuring that the other commander nodes have access to the system bus in equal measure.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS a. The Multiprocessor Computer System 10

Figure 1:
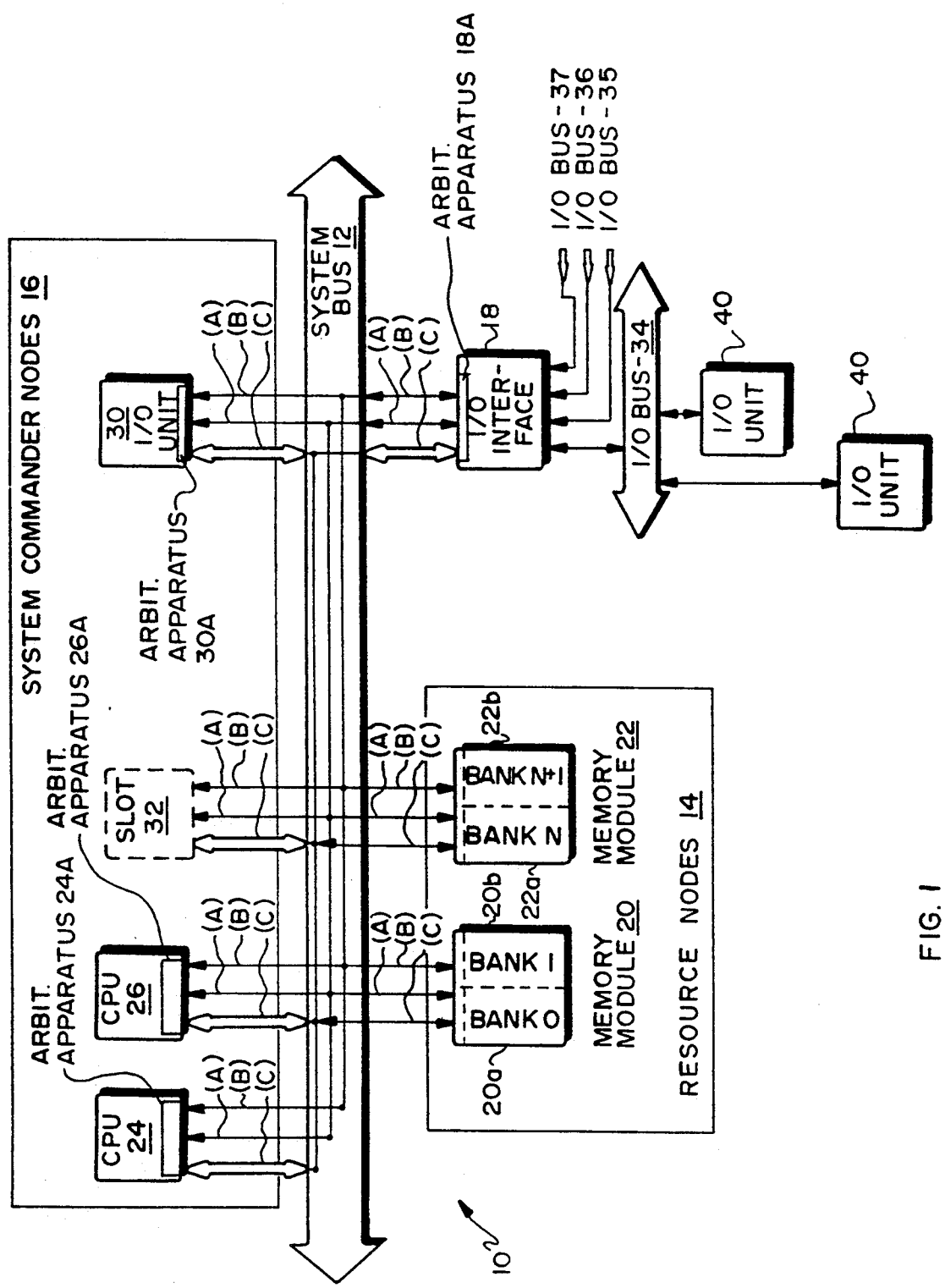
FIG. 1 is a block diagram of a multiprocessor data processing system employing dynamic arbitration for system bus control in accordance with the invention.

FIG. 1 shows a multiprocessor computer system 10 adapted for dynamic arbitration in accordance with a preferred embodiment of the invention. The computer system 10 has a system bus 12 for directly interconnecting one or more resource nodes 14, a plurality of system commander nodes 16, and an I/O interface 18. The resource nodes 14 can include, e.g., first and second memory modules 20, 22. Each memory module 20, 22 has, e.g., first and second, independently accessible memory banks 20a, 20b, 22a, 22b.

The system 10 can accommodate up to, e.g., four system commander nodes 14. In the illustrated configuration, the system 10 has two central processing units (CPU's) 24, 26, an I/O unit 30, and an empty system-commander-node slot, which is shown in phantom at 32, for accommodating another CPU or another I/O unit. Each system commander node 16 includes an associated arbitration apparatus 24A, 26A, 30A. The system 10 can be adapted and configured in accordance with the principles of the invention to accommodate a larger or different number of CPU's and I/O units as system commander nodes 16, depending on the particular application.

The I/O bus interface 18 connects the system bus 12 to a number, e.g., four, of I/O buses 34-37. Connected to each I/O bus 34 is one or more I/O units 40. The I/O interface 18 arbitrates on behalf of the I/O units 40 for control of the system bus 12, and performs any required translation and housekeeping functions for transfers between the I/O buses 34-37 and the system bus 12. The I/O units 30, 40 can include, e.g., disk or tape controllers. Depending once again on the application, the system 10 can be configured to accommodate any number of I/O buses, but, preferably, contains only a single I/O interface 18 regardless of the number of I/O buses to be connected. The I/O interface 18 has an arbitration apparatus 18A for performing arbitrations for control of the system bus 12.

b. The System Bus Structure and Transactions

Figure 2:
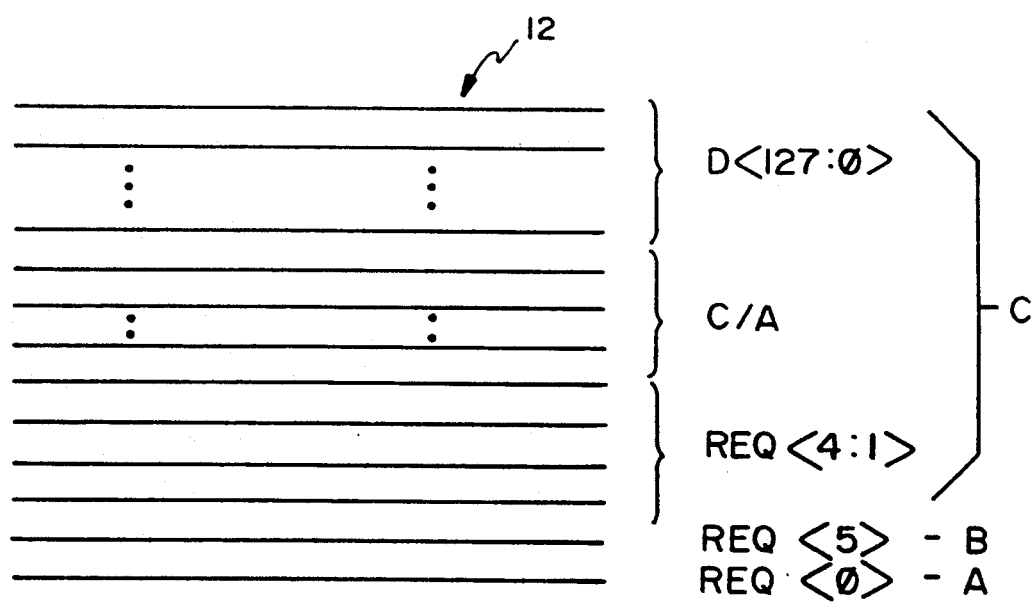
FIG. 2 is an illustration of certain relevant conductors of the system bus of FIG. 1.

With additional reference to FIG. 2, the system bus 12 is shown as including, e.g., 128 conductors (also called "lines") D<127:0> for carrying data; conductors or lines C/A for carrying command/address information; and, e.g., six conductor or lines REQ<5:0> for carrying REQUEST signals from commander nodes 16, 18. ("REQ<5:0>" is read "request lines 0 to 5.") The system bus 12 can also have other conventional conductors or lines, such as, e.g., RESET and STALL conductors, which need not be described herein.

Each bus request conductor REQ<5:0> corresponds to a specific priority level that is used by a particular commander node 16, 18 in arbitrating for access to the system bus 12. For example, REQ<5> corresponds to the highest arbitration priority level, and REQ<0> corresponds to the lowest priority level, and the remaining request lines correspond to intermediate priority levels. When asserting a request on the associated request lines, a commander node drives a corresponding line, e.g., to a high voltage level, i.e., a HIGH (e.g., logical ONE) to communicate both its request for the system bus 12 and its corresponding priority level.

For convenience in designation of the system bus conductors in FIG. 1 and the accompanying description, REQ<0> bears reference letter "A," REQ<5> bears reference letter "B," and the data lines, C/A lines and REQ<4:1> are denoted "C."

Figure 3:
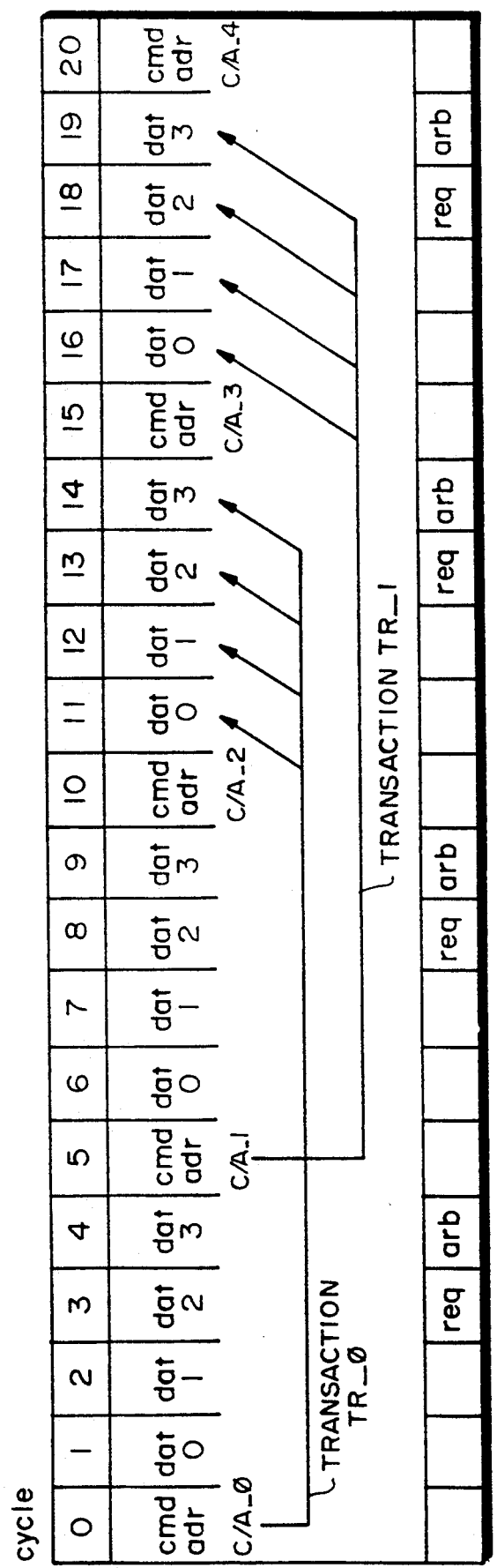
FIG. 3 is a timing diagram for selected signals on the system bus of FIG. 1.

FIG. 3 depicts the bus cycles (numbered at the top of the drawing) for the system bus 12, and the relationship of certain bus transfers relevant to the invention. Each bus cycle has, e.g., a 17-nanosecond duration. As shown, the system bus 12 carries a number of transactions TR_0, TR_1, etc. Each transaction TR_0, TR_1 on the system bus 12 has a single command/address transfer occurring during a command/address cycle and a number, e.g., four, of corresponding data transfers occurring during data cycles DAT_0 through DAT_3. The command portion of the command/address transfer preceding the transaction specifies the type of transaction (e.g., read or write) to be performed, and the address portion identifies the memory locations involved.

Each bus transaction is associated with two additional cycles, which occur just before the command/address cycle for the transaction, and are used to determine system bus access. These two cycles are the request ("REQ") and arbitration ("ARB") cycles. Commander nodes 16, 18 desiring access to the system bus 12 request bus control by asserting the associated request lines during the REQ cycle, and the arbitration is resolved during the ARB cycle. Thus, for example, C/A_1 of cycle 5 is preceded by REQ of cycle 3 and ARB of cycle 4. The commander node 16, 18 that wins the arbitration transfers command/address information during the cycle 5. All the nodes 16, 18 on the system bus 12 monitor the REQ <5:0> to determine who wins the arbitration, and monitor the command/address information to ascertain the memory banks being accessed. The purpose achieved by monitoring these transfers will be made clear shortly.

c. Arbitration for Access to the System Bus 12

Figure 4A:
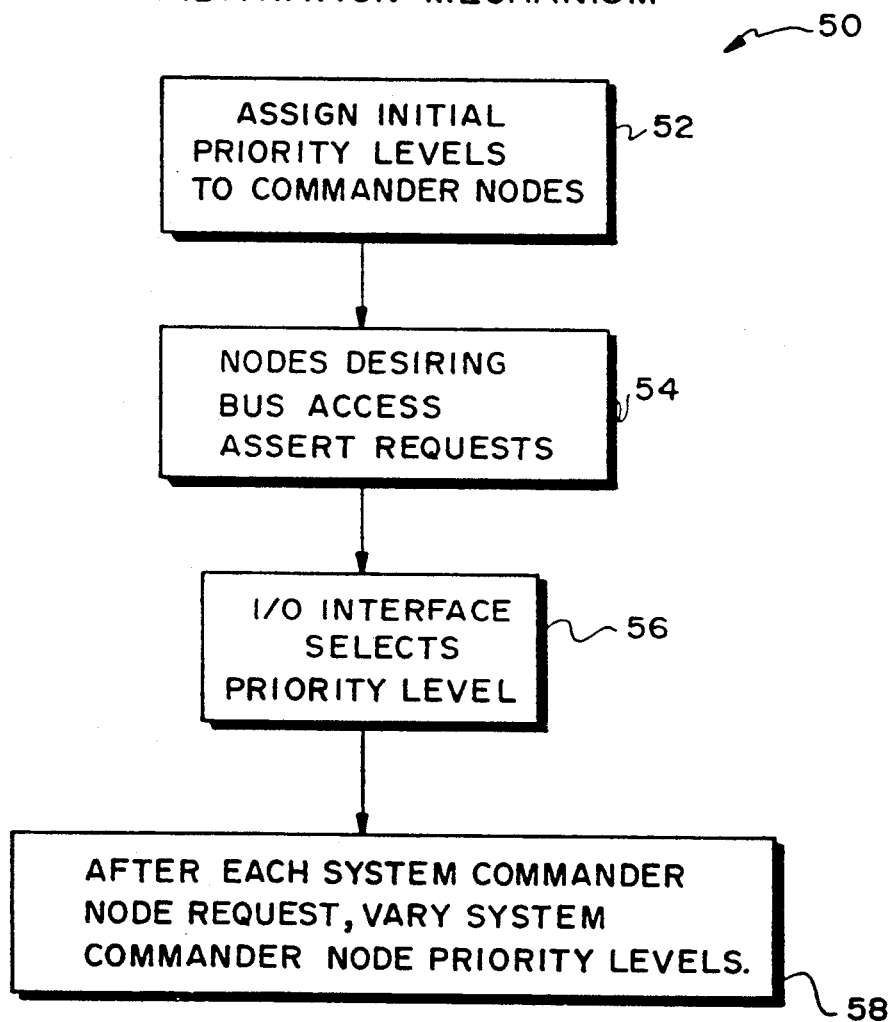
FIGS. 4A and 4B are flow charts depicting the arbitration scheme employed by the data processing system of FIG. 1.
Figure 4B:
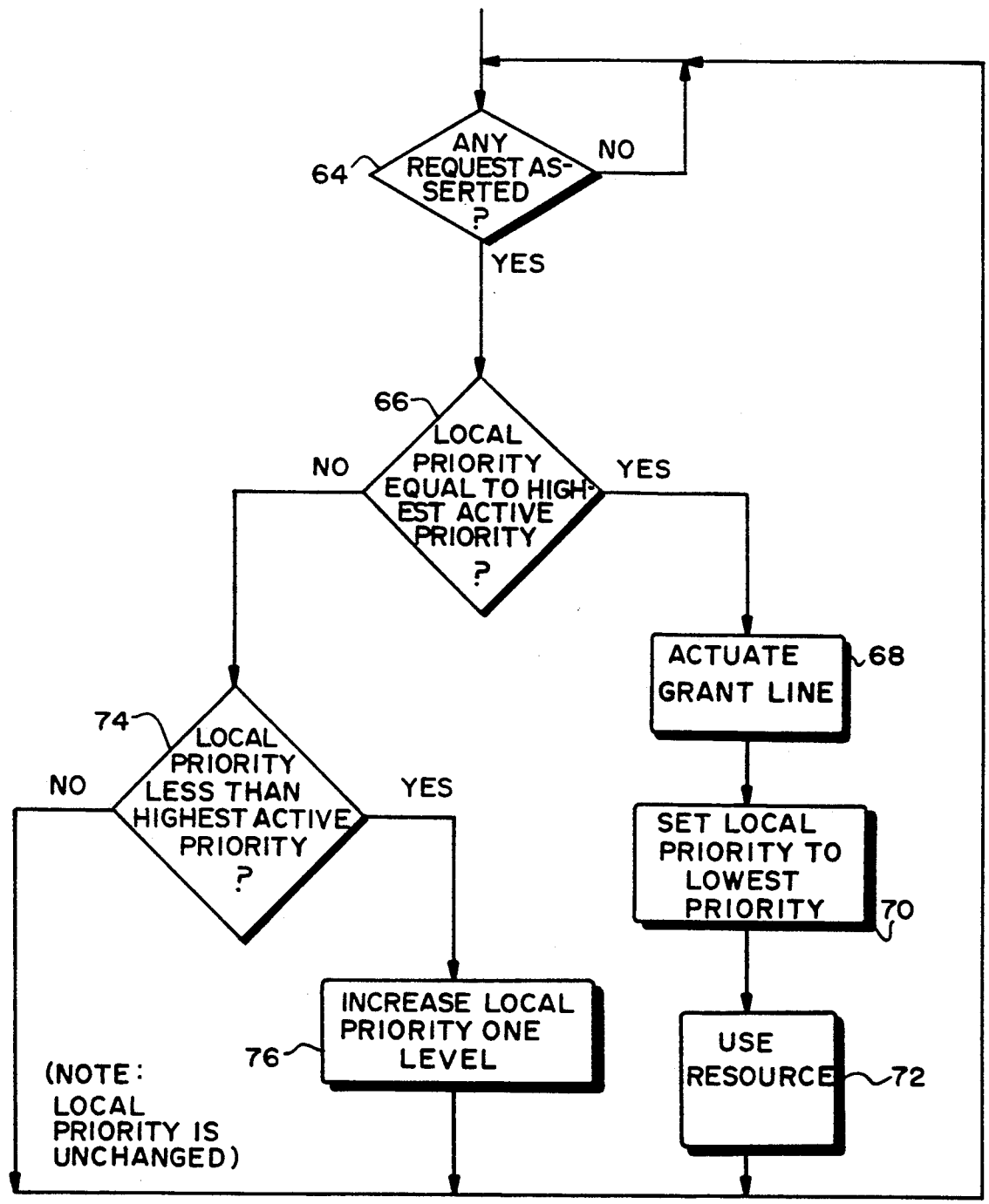

In accordance with the invention, the commander nodes 16, 18 gain access to the system bus 12 using a novel distributive arbitration process 50 illustrated in FIGS. 4A and 4B. In FIG. 4A, the arbitration process 50 effectively begins in step 52 with the commander nodes 16, 18 being assigned priority levels to be used during an initial arbitration. The I/O interface 18 is assigned the highest and lowest priority levels, and thus can assert requests over REQ<5> or REQ<0>. The system commander nodes 16 are each assigned an intermediate priority level for the initial arbitration, and, thus, each commander node can assert requests over one of the conductors REQ<4:1>. For subsequent arbitrations, as described below, the arbitration priority levels of the system commander nodes 16 can change depending on the outcome of the previous arbitration, though the nodes 16 always arbitrate over conductors REQ<4:1>.

For easy reference in the following discussion, the order of priority of the request lines is given in the following table:

REQ<5>...highest priority level
REQ<4>...2nd highest priority level
REQ<3>...3rd highest priority level
REQ<2>...4th highest priority level
REQ<1>...5th highest priority level
REQ<0>...lowest priority level In step 54, the commander nodes 16, 18 desiring access to the system bus 12 assert requests over their associated REQ<5:0> lines during the next available request cycle, e.g., during bus cycle 3 of FIG. 3. As noted above, by asserting the associated REQ <5:0> lines, the commander nodes 16, 18 are asserting the associated priority levels, which can be called the "active priority levels."

As noted in step 56, if the I/O interface 18 elects to participate in the arbitration, it selects one of the two priority levels to use, e.g., following a recurring pattern of selected priority levels (e.g., six high, two low), or based on the history of selections in a number of previous arbitrations.

In step 58, any time a system commander node 16 wins an arbitration, the priority levels of the system commander nodes 16 change in accordance with a varying priority scheme that promotes fairness in system bus access.

FIG. 4B depicts more specifically the procedure followed by each system commander node 16. For purposes of illustration, FIG. 4B will be discussed in conjunction with CPU 24. Preferably, the other system commander nodes 16 follow the same procedure as that described. In step 64, arbitration begins in a request cycle when any of the REQ <4:1> lines are asserted.

By monitoring the REQ <5:0> lines, CPU 24 can determine the outcome of the arbitration in step 66. If the "local priority" (i.e., the priority of CPU 24 in the described example) is equal to the highest active priority level of the contending commander nodes 16, 18, CPU 24 wins the arbitration. Accordingly, in step 68, the arbitration apparatus 24a associated with the CPU 24 supplies a GRANT signal indicating that CPU 24 won the arbitration.

Afterwards, in step 70, the local priority level (i.e., the priority level of CPU 24 in the described example) is changed from the current level to the lowest possible priority level of the system commander nodes 16, i.e., as indicated by REQ<1>. Moreover, in step 72, CPU 24 can proceed to access the system bus 12. Then, the procedure is continued for the next request cycle on the system bus 12 by entering step 64.

With reference again to step 66, if the local priority level is not the highest active level, a determination is made in step 74 of whether the local priority level is higher than the highest active level. When the local priority level is higher than the highest active priority level, the arbitration apparatus 24b does nothing further and enters step 64 for the next request cycle. When the local priority level is less than the highest active priority level, the local priority level is increased to one greater priority level than the current priority level in step 76, and then enters step 64.

Accordingly, the varying priority scheme for the system commander nodes 16 provides higher arbitration priority levels to nodes 16 that have not had access to the system bus 12 in recent transactions, and lower arbitration priority levels to nodes 16 that have enjoyed recent access to the system bus 12.

Although each step is shown in FIGS. 4A and 4B as a separate entity, in the preferred embodiment, the arbitration process proceeds with parallel operations and each arbitration process requires a single clock cycle.

An example will aid in understanding the arbitration priority levels used by the system commander nodes 16. Suppose the system commander nodes 16 have the priorities shown in the following table:

REQ<4>....I/O UNIT 30
REQ<3>....EMPTY SLOT 32
REQ<2>....CPU 24
REQ<1>....CPU 26 and that CPU's 24 and 26 participate in the arbitration by asserting their respective associated conductors REQ_1 and REQ_2. CPU 24 would win the arbitration since it was arbitrating at the higher priority level, i.e., REQ<2> is higher than REQ<1>. For the next-following arbitration, CPU 24 would drop its request level down to REQ_1, and CPU 26, which was at REQ_1, would bump its request level up to REQ_2. The priority levels of the other system commander nodes 16 would be unchanged.

Now consider another example, where the priority levels are as given in the above table, and I/O unit 30 wins the arbitration. For the next-following arbitration, the varying priority scheme of the invention will cause the system commander nodes 16 to change their priorities levels as shown below:

REQ<4>....EMPTY SLOT 32
REQ<3>....CPU 24
REQ<2>....CPU 26
REQ<1>....I/O UNIT 30

Accordingly, and to use a helpful analogy, the varying priority scheme for the system commander nodes 16 can be thought of as a line or queue. If any member of that line leaves its position, as would be the case when a system commander node wins an arbitration, the members of the line behind the departed member move up in relative position, while members of the line in front of the departed member remained in the same relative position in the line. The departed member then takes his place at the end of the line.

With reference again to FIG. i, in order to effectuate the above-described arbitration process, the commander nodes 16, 18 monitor the request conductors A, B and the request conductors REQ<4:1> (FIG. 2) of lines C. In addition, the system commander nodes 16 can assert the request conductors REQ<4:1> (FIG. 2) of lines C, and the I/O interface 18 can assert request conductors A or B. The memory banks 20a-22b monitor the request conductors A, B and the request conductors REQ<4:1> (FIG. 2) of lines C to determine when a request is going to be active on the system bus 12. This enables the memory banks 20a-22b to synchronize with the requests and respond to transactions at the proper times.

d. I/O Interface 18

Figure 5:
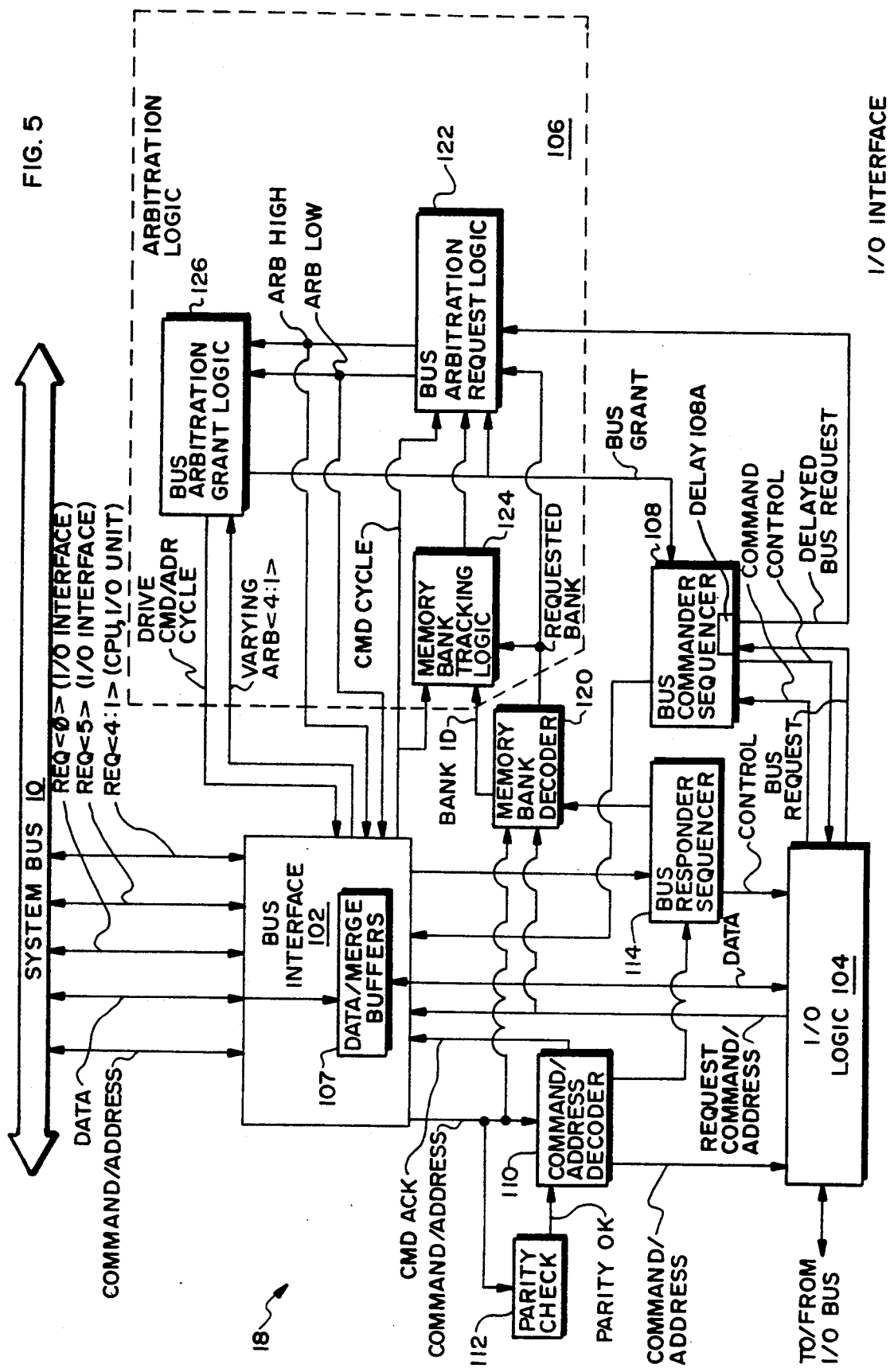
FIG. 5 is a block diagram of a preferred embodiment of the I/O interface of FIG. 1.

FIG. 5 shows the I/O interface 18 in greater detail. The I/O interface 18 has a bus interface 102 and an I/O logic unit 104, which together act as a bridge between the system and I/O buses 12, 34-37 (FIG. 1). Thus, the bus interface 102 and I/O logic unit 104 can be thought of as bus adapters, which include transceivers (not shown) for driving signals on the respective system and I/O buses 12, 34-37, and circuitry (not shown) for performing any addressing and housekeeping chores needed to carry out transfers between the respective buses 12, 34-37. The bus interface 102 also has a data/merge buffer 107 for locally storing received data.

The I/O logic unit 104 responds to transfers destined for resource nodes 14 on the system bus 12 by asserting BUS REQUEST signals to a bus commander sequencer 108. In response to each BUS REQUEST signal, the bus commander sequencer 108 asserts a DELAYED BUS REQUEST signal to an arbitration logic unit 106. The illustrated arbitration logic unit 106 is an preferred embodiment of the arbitration apparatus 18A of FIG. 1 adapted for use in a particular application of the invention.

The arbitration logic unit 106 controls arbitration on behalf of the I/O interface 18. In response to each DELAYED BUS REQUEST signal, the arbitration logic unit 106 causes the bus interface 102 to assert either ARB HIGH on REQ<5> or ARB LOW on REQ<0> of the system bus 12. The arbitration logic unit 106 also monitors arbitrations to determine whether the I/O interface 18 has won and therefore gained access to the system bus 12.

The bus commander sequencer 108 derives command/address information for the operation for which the system bus 12 is being requested from a CONTROL signal received from the I/O logic 104, and passes control information to the bus interface 102. In response to a REQUEST COMMAND/ADDRESS signal from the I/O logic 104 and the control information from the bus commander sequencer 108, the bus interface 102 generates a COMMAND/ADDRESS transfer of appropriate format for the system bus 12. The bus interface 102 transmits the generated COMMAND/ADDRESS transfer over the system bus 12 only if the arbitration logic unit 106 indicates that the I/O interface 18 has gained control of the system bus 12 by winning an arbitration.

The bus commander sequencer 108 also sends a CONTROL signal to the I/O logic 104 for causing data received by the I/O logic 104 from the I/O units 40 to be passed over a DATA path to the bus interface 102. The received data is stored in the data/merge buffers 107 in the bus interface 102 for transmission over the system bus 12 at the appropriate bus cycle following the associated transmitted command/address transfer.

Of course, transfers can also be received over the system bus 12 by the I/O interface 18. The bus interface unit 102 provides COMMAND/ADDRESS transfers received over the system bus 12 to a command/address decoder 110 and a parity check 112. The command/address decoder 110 decodes the COMMAND/ADDRESS transfer to determine whether the destination address contained in that information matches the address of the I/O interface 18.

The parity check 112 detects errors in the command/address information by comparing the parity of the command/address information with a received parity value contained in that transfer. If the parity matches, the command/address information is regarded as valid, and the parity check 112 issues a PARITY OK signal to the command/address decoder.

In response to the PARITY OK signal, and if the destination address matches the address of the I/O interface 18, the command/address decoder 110 passes the COMMAND/ADDRESS transfer to the I/O logic 104, and sends a COMMAND ACKNOWLEDGE signal to the bus interface 102 to indicate the valid match. In response to the COMMAND ACKNOWLEDGE signal, the bus interface 102 sends the data associated with that command/address information to the I/O logic 104 over a DATA path. A bus responder sequencer 114 generates a CONTROL signal, which controls operation of the I/O logic 104 with respect to the data received over the DATA path.

The I/O interface 18 also has a memory bank decoder 120, which receives the COMMAND/ADDRESS transfer from the bus interface 102, and the REQUEST COMMAND/ADDRESS signal from the I/O logic 104, together with a timing signal from the bus responder sequencer 114. The memory bank decoder 120 decodes these signals to generate respectively a BANK ID signal that identifies the memory bank 20a-22b involved in the command/address transfer from the system bus 12, and a REQUESTED BANK signal that identifies the memory bank 20a-22b involved.

The arbitration logic unit 106 implements an improved arbitration technique, in which the I/O interface 18 can arbitrate at either of two priority levels, as described above. The arbitration logic unit 106 has a bus arbitration request logic unit 122, a memory bank tracking logic unit 124, and a bus arbitration grant logic unit 126.

The bus arbitration request logic 122 responds to the DELAYED BUS REQUEST signal by asserting either an ARB HIGH signal indicating that the I/O interface 18 should arbitrate next at the highest priority level, or an ARB LOW signal indicating that the I/O interface 18 should arbitrate next at the lowest priority level. These signals are clocked to coincide with the system bus cycles by a CMD CYCLE signal received from the bus interface 102.

The selection of either the ARB HIGH or ARB LOW signals, e.g., follows a re-occuring pattern of highest and lowest priority levels, or depends on the priority levels used in a number of prior arbitrations.

Moreover, the bus arbitration request logic 122 will not assert ARB HIGH or ARB LOW signals, and thus will effectively inhibit participation by the I/O interface 18 in arbitrations occurring on the request cycles during which the particular memory bank 20a-22b involved in the next request from the I/O logic unit 104 is unavailable.

The information concerning memory bank availability is furnished by the memory bank tracking logic 124. The memory bank tracking logic unit 124 stores a database, e.g., in a look-up table or using discrete latches, which, for each memory bank 20a-22b identifies whether the bank was accessed during either of the, e.g., two most-recent arbitrations, and thus is "unavailable" during the next request cycle.

Upon being accessed, a particular memory bank 20a-22b is unavailable for the next two request cycles.

By storing the BANK ID signal, i.e., the bank ID's, for the two most recent transactions on the system bus 12, the memory bank tracking unit 124 can assure that the I/O interface 18 will not futilely attempt to arbitrate for the system bus 12 to access a memory bank 20a–22b which is unavailable. Such arbitration would only waste system resources. Thus, if the REQUESTED BANK signal indicates that a particular memory bank 20a–22b, e.g., bank 20a, is to be requested, and that memory bank 20a was accessed during either of the two most-recent transactions, then the bus arbitration request logic 122 will stall and not assert either ARB HIGH or ARB LOW until the third arbitration following that memory's access. This and the memory bank decoder 120 are further described in the above-identified related application entitled "Memory Bank Management and Arbitration in Multiprocessor Computer System."

Accordingly, in response to each DELAYED BUS REQUEST signal, the bus arbitration request logic unit 122 thus selects either ARB HIGH or ARB LOW, or awaits memory-bank availability, depending on bus request and access information received from the memory bank tracking logic unit. The bus arbitration request logic 122 is synchronized to the system bus cycles by the CMD CYCLE signal received from the bus interface unit 102.

The bus arbitration request logic 122 passes the ARB HIGH and ARB LOW signals to the bus interface 102, which, in response, asserts the associated one of REQ<5> and REQ<0> in arbitrating for the system bus 10. The bus arbitration grant logic 126 determines whether the I/O interface 18 has won the arbitration. For this, the bus arbitration grant logic 126 also receives the ARB HIGH and ARB LOW signals from the bus arbitration request logic 122 and a VARYING ARB <4:1> signal from the bus interface 102 indicating whether any of the system commander nodes 16 are arbitrating for the system bus 12. Whenever the ARB HIGH signal is asserted to indicate that the I/O interface 18 is arbitrating at the highest priority level, the I/O interface 18 wins the arbitration regardless of whether any of the system commander nodes 16 are also contending for the system bus 12. Also, whenever the ARB LOW signal is asserted to indicate that the I/O interface 18 is arbitrating at the lowest priority level, but none of the system commander nodes 16 are requesting the system bus 12 and therefore the VARYING ARB <4:1> signal is deasserted, the I/O interface 18 again with the arbitration.

The bus arbitration grant logic 126 asserts the BUS GRANT signal to the bus commander sequencer 108 and the bus arbitration request logic 122 to indicate that the I/O interface 18 has won the arbitration and thus controls the system bus 12. In response to the BUS GRANT signal, the bus commander sequencer 108 deasserts the DELAYED BUS REQUEST signal.

For a further description of the I/O interface 18, reference can be had to the above-identified, related application, entitled "Dynamic Arbitration for System Bus Control in Multiprocessor Computer System."

e. System Commander Nodes 16

Figure 6:
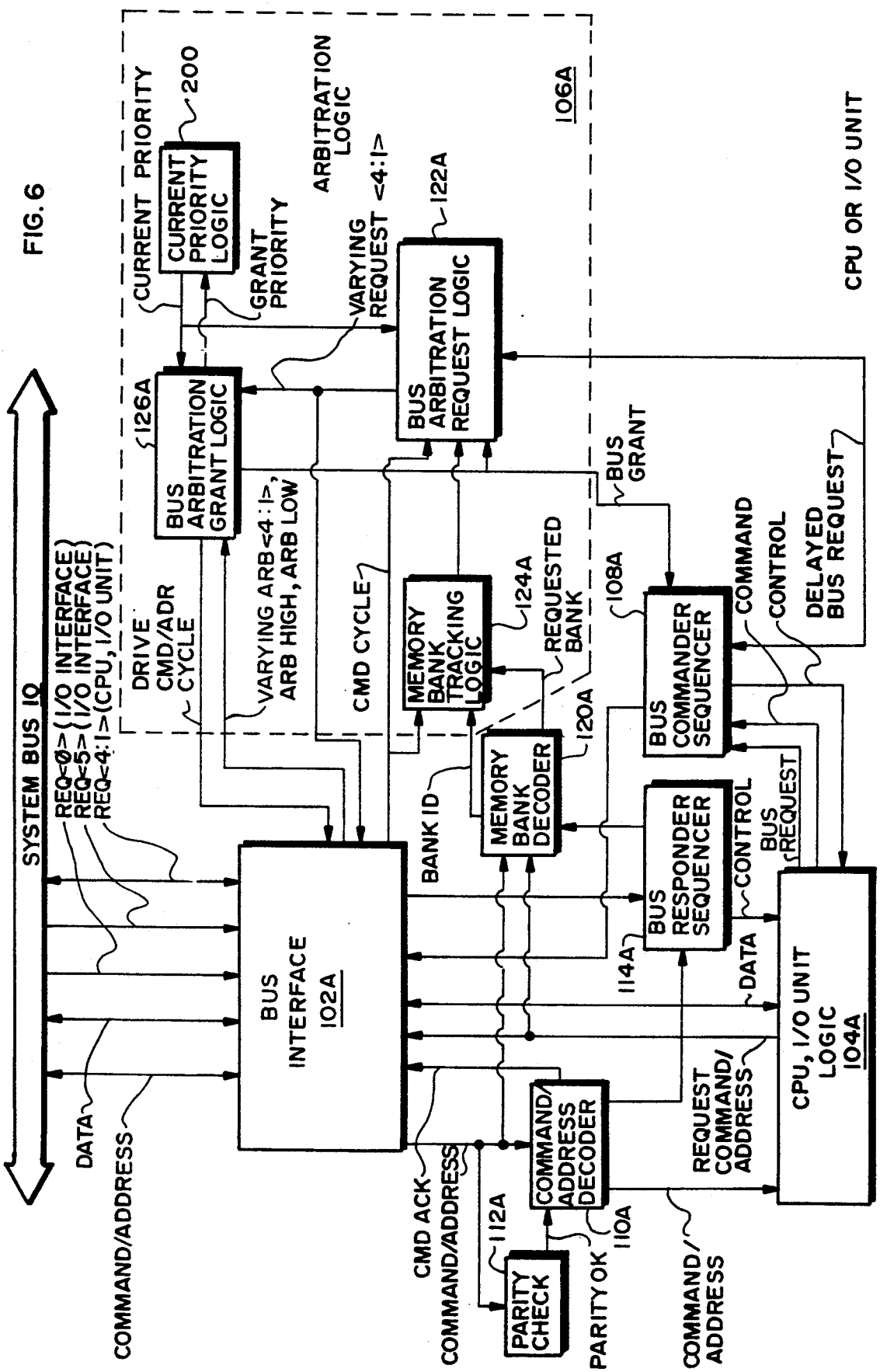
FIG. 6 is a block diagram of a preferred embodiment of one of the system commander nodes of FIG. 1.

FIG. 6 shows an illustrative embodiment of the invention as implemented for the system commander nodes 16 including the CPU's 24, 26 and the I/O unit 30. As can be seen, this figure is virtually the same FIG. 5, except for the arbitration logic unit 106. For convenience, components analogous to those in FIG. 5 bear the same reference numbers, with an added suffix of "A."

In FIG. 6, the bus arbitration request logic 122A asserts one of the priority-level-representing VARYING REQUEST <4:1> signals in response to a DELAYED BUS REQUEST signal from the I/O logic 104A of the illustrated node 16. In response, the bus interface 102A asserts the VARYING ARB conductor REQ<4:0> indicated by the REQ <4:1> signals.

The priority level represented by the VARYING REQUEST <4:1> signals is determined by an additional component that was not present in FIG. 5, namely, the current priority logic 200. The current priority logic 200 tracks the priority levels of the system commander nodes 16 via a GRANT PRIORITY signal received from the bus arbitration grant logic 126A, and generates a CURRENT PRIORITY signal that causes the BUS ARBITRATION REQUEST LOGIC 122A to assert the VARYING REQUEST <4:1> signal indicating a priority level in accordance with the varying priority scheme described above.

The bus arbitration grant logic 126A receives and compares the priority indicated by the VARYING REQUEST <4:1> signal with those indicated by the VARYING ARB <4:1>, ARB HIGH, and ARB LOW signals received from the bus interface 102A to determine whether the illustrated system commander node 16 has won the arbitration.

Figure 7A:
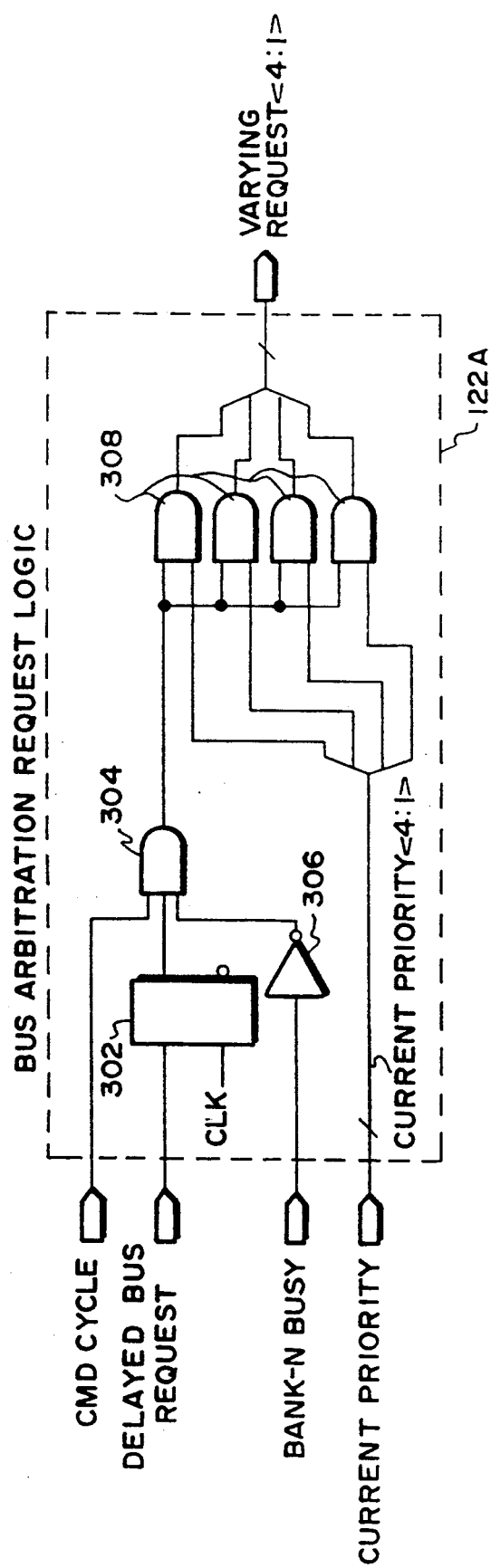
FIGS. 7A-7C are schematic representations, partly in block diagram form, of an illustrative implementation of certain components of the system commander node of FIG. 6.
Figure 7B:
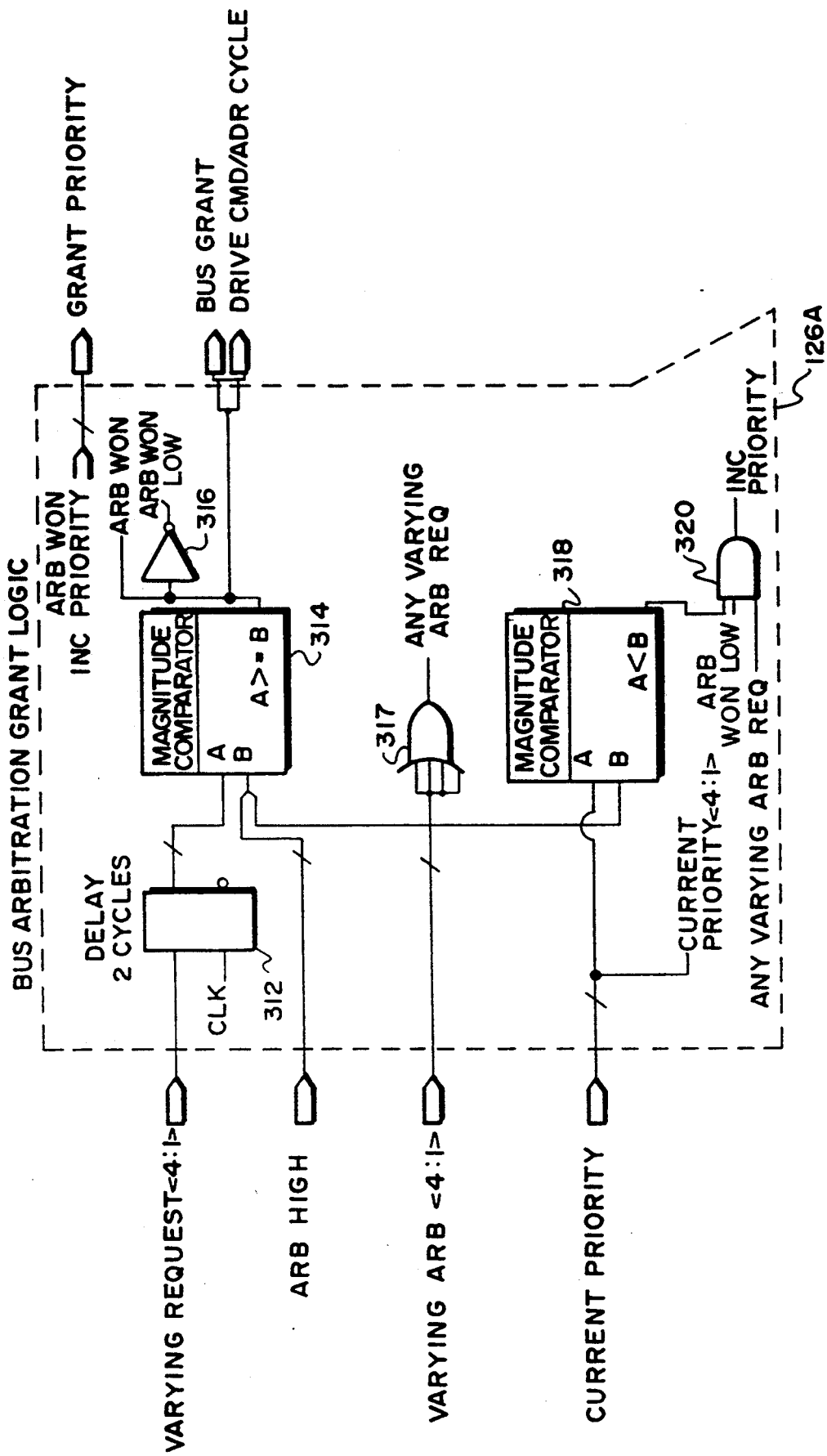
Figure 7C:
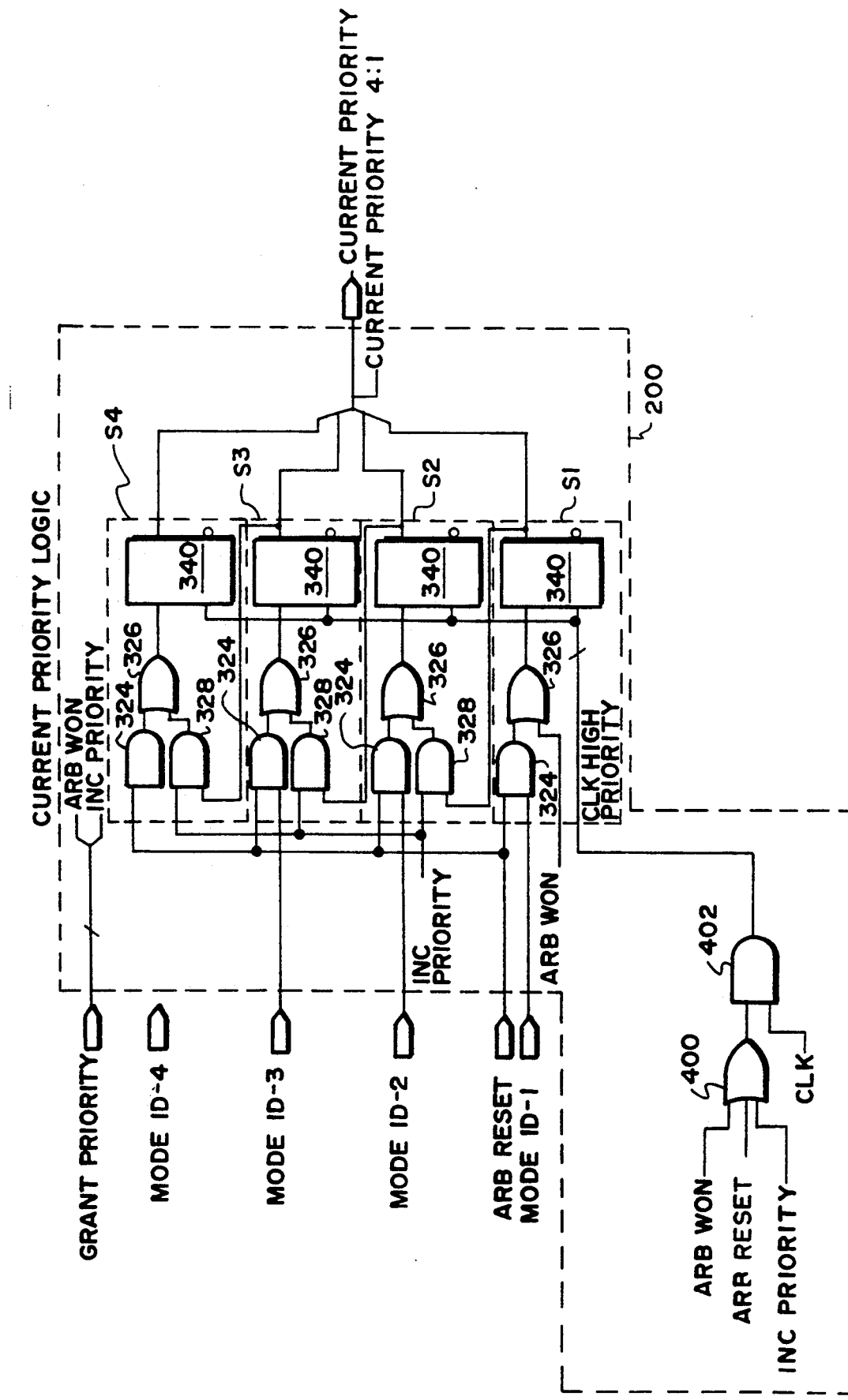

FIGS. 7A–7C show the bus arbitration request logic 122A, the bus arbitration grant logic 126A, and the current priority logic 200, respectively, in greater detail for CPU 24. The components of the arbitration logic unit 106A for the other system commander nodes 16 are the same as those illustrated.

As can be seen in FIG. 7A, the bus arbitration request logic 122A has a latch 302 for storing the DELAYED BUS REQUEST signal. The contents of the latch 302 are provided to an AND gate 304, which also receives the CMD CYCLE signal and an inverted version (by way of inverter 306) of the BANK-N busy signal The output of the AND gate 304 is, e.g., a logical ONE when all the input signals thereto are asserted, i.e., when three condition co-exist: (i) the illustrated commander node 16 desires to access the system bus 12, (ii) the proper cycle is occurring for making a request, and (iii) the bank involved is available.

The output of the AND gate 304 is supplied to a first input terminal of each of a plurality of AND gates 308, each of which receives one of the bit-lines carrying the CURRENT PRIORITY <4:1> signals at a second input terminal thereof. When both the received bit-line of the CURRENT PRIORITY <4:1> signals and the output of the AND gate 304 logical ONE, the corresponding bit-line carrying the VARYING REQUEST <4:1> signal is asserted, e.g., has a logical ONE value. Only one bit-line can be asserted at a given request cycle.

As can be seen in FIG. 7B, the bus arbitration grant logic 126A has a latch 312 for storing or delaying the VARYING REQUEST <4:1> signals for two cycles. The delayed VARYING REQUEST <4:1> signals are applied to an input terminal A of a magnitude comparator 314, which receives the ARB HIGH signal and the VARYING ARB <4:1> signals at an input terminal B thereof.

The bit lines carrying the input signals, i.e., the delayed VARYING REQUEST <4:1> signals and VARYING ARB <4:1> signals should be viewed as defining binary numbers. Thus, for example, if only the second bit line of VARYING REQUEST <4:1> signals is asserted, i.e. VARYING REQUEST <2>, the resulting binary signal is 0010.

The magnitude comparator 314 compares the VARYING REQUEST <4:1> signals with the ARB HIGH and VARYING ARB <4:1> signals. That is, the magnitude comparator 314 compares the binary value of the VARYING REQUEST <4:1> signals with the binary value of the VARYING ARB <4:1> signals, and, if the VARYING REQUEST <4:1> signals have a greater or equal binary value, and the ARB HIGH signal is not asserted, the magnitude comparator 314 asserts an ARB WON signal to indicate that CPU 24 has won the arbitration. Otherwise, the ARB WON signal is deasserted. The ARB WON signal is used as the BUS GRANT and DRIVE CMD/ADR CYCLE signals in FIG. 6. The ARB WON signal is also provided to an inverter 316, whose output is an ARB WON LOW signal.

The VARYING ARB <4:1> signals are provided to an OR gate 317, which asserts an ANY VARYING ARB REQ signal if any of the input signals are asserted.

The VARYING ARB <4:1> signals are provided to an OR input terminal B of a magnitude comparator 318, which receives the CURRENT PRIORITY signals (four bits wide) at an input terminal A thereof. If the binary value of the CURRENT PRIORITY signals is less than the binary value of the VARYING ARB <4:1> signals, the magnitude comparator 318 asserts its output value of, e.g., logical ONE. Otherwise, the output of the magnitude comparator 318 is deasserted. Thus, the output of the magnitude comparator 318 is asserted whenever the priority of CPU 24 is less than that of the contending system commander nodes 16.

The output of the magnitude comparator 318 is provided to an AND gate 320, which also receives the ARB WON LOW signal and the ANY VARYING ARB REQ signal. The output of the AND gate 320 is an INC PRIORITY signal, which indicates that the priority level of the CPU 24 is to be incremented. Thus, the priority level is incremented whenever three conditions co-exist: (i) any of the system commander nodes arbitrate for the system bus 12, (ii) CPU 24 does not win that arbitration, and (iii) the winning commander node has a higher priority level than CPU 24. The INC PRIORITY signal and the ARB WON signals are combined into a two-bit signal, called the GRANT PRIORITY signal.

As shown in FIG. 7C, the current priority logic 200 receives the GRANT PRIORITY signal and divides it into the ARB WON and INC PRIORITY signals. The current priority logic 200 also receives a plurality of NODE ID signals, each identifying a physical slot on the system bus 12 containing one of the system commander node 16. For instance, the NODE ID=4 signal identifies the fourth system commander node slot, which, for example, could contain the I/O unit 30.

The current priority logic 200 has a plurality of stages S1-S4 corresponding to the NODE ID signals. Stages S2-S4 are the same, and, therefore, we need only describe stage S2. The NODE ID=2 signal of stage S2 is provided to a first input of an AND gate 324, which also receives an ARB RESET signal. The ARB RESET signal is asserted on system initialization, e.g., on power up or on error reset. The output of each AND gate 324 is supplied to an associated OR gate 326.

An AND gate 328 receives the INC PRIORITY signal and a feedback signal, and supplies an output to the OR gate 326. The output of the OR gate 326 is supplied to a latch 340, which is clocked by a CLK NEW PRIORITY signal.

The CLK NEW PRIORITY signal is asserted, e.g., has a logical ONE value whenever the priority level of CPU 24 is incremented, the system is reset, or the CPU 24 has won an arbitration. To generate the CLK NEW PRIORITY signal, the ARB WON, ARB RESET and INC PRIORITY signals are supplied to an OR gate 396. The output of the OR gate 396 is provided to an AND gate 398, which also receives a clock signal. The output of the AND gate 398 is the CLK NEW PRIORITY signal.

The output of the latch 340 of stage S2 is combined with the outputs of the latches 340 of the other stages S1 and S3-S4 to produce a four-bit-wide CURRENT PRIORITY <4:1> signal, which serves as the CURRENT PRIORITY <4:1> signal. The output of the latch 340 of stage S2 is also provided to the OR gate of the stage S3, i.e., the stage corresponding to the next higher NODE ID, as the feedback signal thereto.

The stage S1 is slightly different from the other stages S2-S4, in that there is no AND gate 328, and the OR gate 326 of stage S1 receives the ARB WON signal in addition to the output of the AND gate 324 of stage S1. The output of latch 340 of stage S1 is supplied as the feedback signal to AND gate 328 of stage S2.

To understand the illustrated current priority logic, suppose that CPU 24 is located in slot ID=2. When the system 10 is powered up (i.e., the RESET signal is asserted), the AND gate 324 of stage S2 (i.e., the stage corresponding to the system bus slot containing the CPU 24) produces, e.g., a logical ONE output, which causes the OR gate 326 of that stage S2 to produce a logical ONE value. That value from the OR gate 326 is passed by the latch 340, and causes the bit of the CURRENT PRIORITY signal corresponding to slot ID=2 to be asserted, i.e., to assume a logical ONE value. The other bits of the CURRENT PRIORITY signal will have a logical ZERO value.

When the priority level is to be incremented, the INC PRIORITY signal is asserted, and the CLK NEW PRIORITY signal causes the latch 340 of stage S2 to supply its contents to the AND gate 328 of stage S3. That signal and the INC PRIORITY signal applied to that AND gate 328 produce, e.g., a logical ONE output therefrom, which causes the OR gate 326 of the stage S3 to produce a logical ONE value. That value from the OR gate 326 is passed by the latch 340 of stage S3 as the asserted bit of the CURRENT PRIORITY signal. Owing to the feedback signal from stage S1, the corresponding bit from stage S2 will be deasserted.

Moreover, if the CPU 24 wins an arbitration, the ARB WON signal is asserted, which causes the CURRENT PRIORITY bit corresponding to stage S1 to be asserted, and the other CURRENT PRIORITY bits to be deasserted.

The illustrated system 10 is shown for illustrative purposes. Indeed, generalizing, computer systems practicing the invention can be configured with other numbers and types of nodes. Accordingly, the system can have "N" CPU's, and "M" memory banks connected to the system bus 12, where "N" and "M" can be any positive integers. The system also can have "U" I/O units connected to the system bus 12 directly or "V" connected via the I/O bus 34-37, where "U" and "V"

are positive integers. In the illustrated embodiment, "N+U=4" system commander nodes 16. Other embodiments could have, e.g., "N+U=8" system commander nodes.

The system has a request line for each system commander node, and two for the I/O interface 18. Thus, if one regards a single request line for each commander node to be conventional for distributive arbitration, the invention only requires one additional request line to effectuate its improved arbitration scheme.

f. Alternative Embodiment

Figure 8:
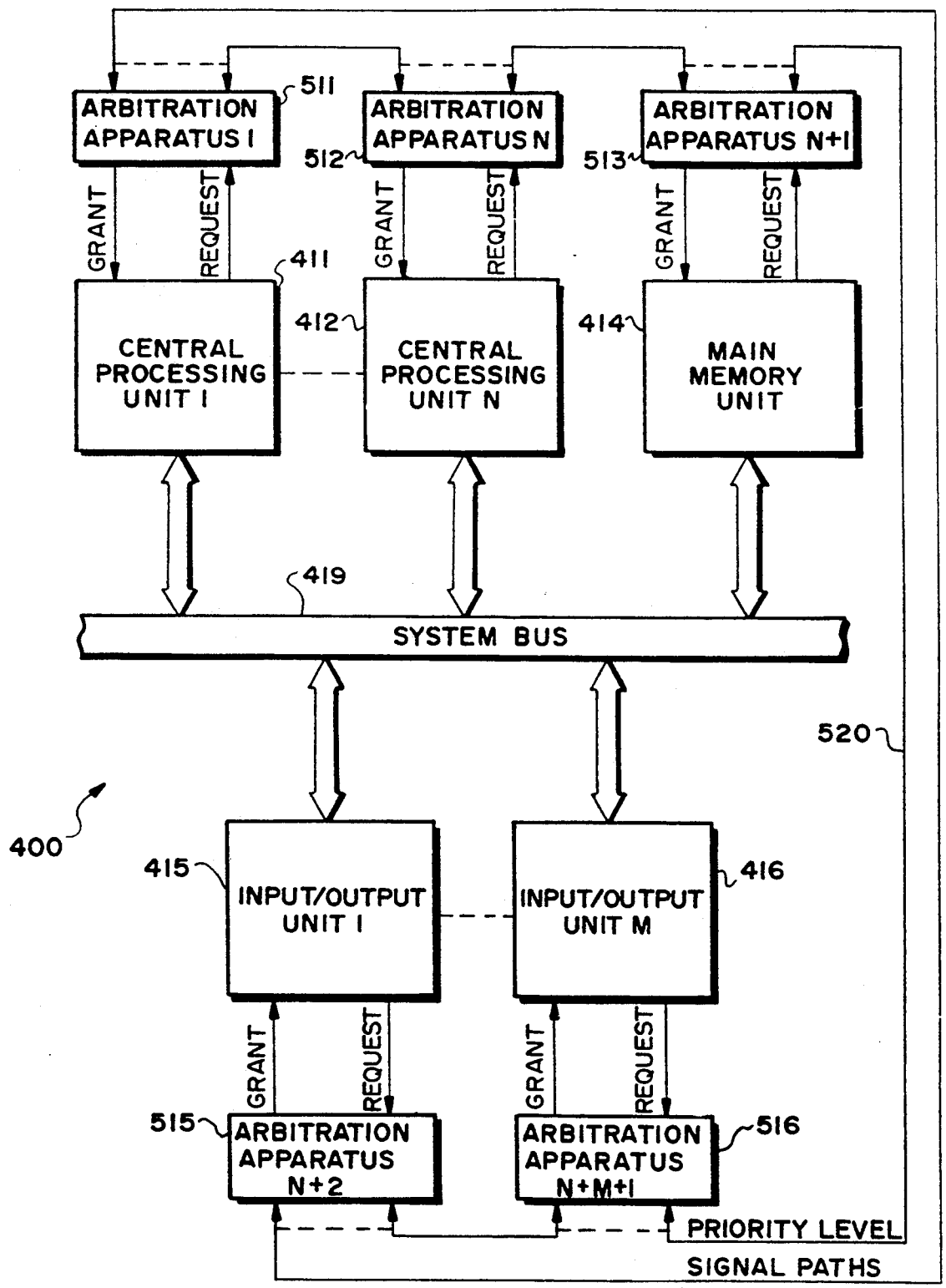
FIG. 8 is a block diagram of a bus-oriented data processing system illustrating the associated arbitration apparatus and the signal paths transferring priority information in accordance with an alternative embodiment of the invention.

FIG. 8 shows a bus-oriented data processing system 400 in accordance with an alternative embodiment of the invention. The data processing system 400 includes a system bus 419, central processing unit No. 1 411 through central processing unit No. N 412, a main memory unit 414 and a plurality of input/output units 415-416. The central processing units 411-412 manipulate data and program information. The main memory unit 414 stores data and program information to be used by the central processing units 411-412. The input/output units 415-416 couple the data processing system to peripheral units, to communication devices, to mass storage devices, etc. Each of these data processing system subsystems can require access to the system bus 419 to transfer data information, control information and program information thereon.

The data processing system 400 also includes arbitration apparatus 511-516 associated with each subsystem, i.e., arbitration apparatus 511 is associated with central processing unit 411, etc. The arbitration apparatus 511-516 receives a REQUEST signal from the associated subsystem or processing unit when the processing unit has a requirement for access to the system bus. When the arbitration apparatus 511-516 determines that the associated processing unit is to receive access to the system bus, a GRANT signal is applied by the arbitration apparatus to the associated processing unit.

A priority signal bus 520, having a signal path associated with each level of priority, has each signal path coupled to each arbitration apparatus. The number of priority level signal paths will therefore be at least as great as the number of processing units possibly requiring access to the system bus (i.e., shared resource).

Figure 9:
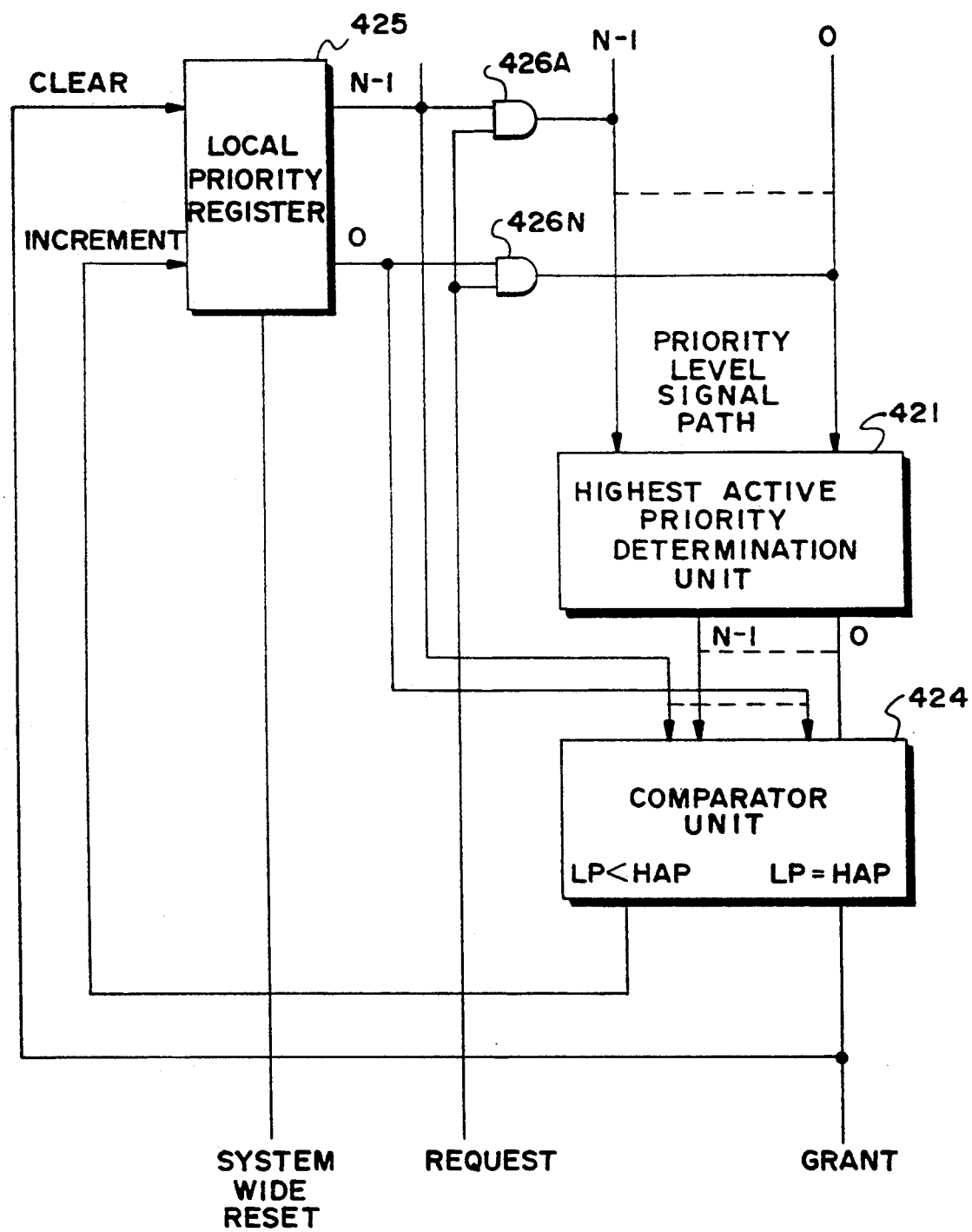
FIG. 9 is a block diagram of the principal components arbitration apparatus unit of FIG. 8.

Referring next to FIG. 9, a block diagram of the principal components of an arbitration apparatus 511 is shown. The priority level signal paths 0 through N−1 are applied to the highest active priority determination unit 421. The unit 421 determines which of the priority signal paths has the highest active signal asserted thereon. Because each priority signal path has a priority level assigned thereto, this determination identifies the highest active priority level. The local priority register 425 has a logic signal stored in a register position associated with the priority of the associated processing unit. After initialization, the contents of register 425 are determined by a comparator unit 424 as a result of an arbitration activity.

The contents of register 425 and the highest priority determination unit 421 are compared by comparator unit 424. When the result of this comparison is that the contents of the register 425 are equal to the output signal of the highest active priority determination unit 421, then the GRANT signal is asserted for the associated processing unit. This GRANT signal is applied to local priority register 425 for clearing the contents of the register 425, i.e., the register 425 indicating that the associated register has the lowest priority.

When the result of the operation of comparator unit 424 is that the contents of local priority register 425 are less than the output signal of the highest active priority determination unit 421, (i.e., the local priority level is lower than the highest active priority level), a signal is applied to local priority register 425 which results in incrementing the level register 425 (i.e. raising the priority level of the associated processing unit by one level).

Between each priority level position of local priority register 425 and the associated signal path, a logic AND gate 426A through 426N is interposed. Each logic AND gate receives the REQUEST signal at a second terminal thereof. The presence of the REQUEST signal will cause an active signal to be asserted on the priority signal level path associated with the local priority level.

The purpose of the system-wide reset signal applied to the local priority register 425 is to initialize each arbitration unit in the system to a unique priority level.

In the disclosed embodiment, the synchronization of the arbitration apparatus with each other and with the remainder of the data processing system has not been indicated. It will be clear that such synchronization can be achieved by a multiplicity of functionally equivalent techniques involving timing and/or control signals.

It will be clear that the dynamic priority arbitration of the present invention can accommodate a number of variations that depart from the preferred embodiment implementation described above. As an example, in any data processing system, one processing unit can be so important as to be afforded the top priority level whenever access to a shared resource is attempted. In this situation, only the arbitration apparatus associated with the highest priority processing unit can activate the signal path associated with the highest priority level. Similarly, any arbitrary priority level can be assigned to a processing unit; the incrementing of the local priority register of the arbitration apparatus to which that priority level has not been assigned not being incremented when a signal path having the assigned priority level is activated.

The foregoing description has been limited to a specific embodiment of this invention. It will be apparent, however, that variations and modifications may be made to the embodiment, with the attainment of some or all of the advantages of the invention. Therefore, it is the object of the appended claims to cover all such variations and modifications as come within the true spirit and scope of the invention.

What is claimed is:

1. In a data processing system having a plurality of commander nodes and at least one resource node interconnected by a system bus, one or more of said commander nodes contending for control of said system bus to access the resource node during each of a plurality of arbitrations, a bus arbitration method for determining the one of said contending commander nodes that is to gain control of the system bus to access the resource node during each said arbitration, said method comprising the steps of:

A) assigning priority levels to said commander nodes, such that each said commander node of a first set of said commander nodes is assigned a single priority level for each said arbitration and each commander node of a second set of said commander nodes is assigned more than one priority level for each said arbitration;

B) during each of said arbitrations, each said contending commander node of said first set of commander nodes generating a first arbitration signal during a predetermined bus cycle indicating the priority level assigned to that node, and each contending commander node of said second set of commander nodes generating a second arbitration signal during the same bus cycle during which said contending commander nodes of said first set of commander nodes generates said first arbitration signal, said second arbitration signal generated by said contending commander node of said second set of commander nodes indicating one of the priority levels of that node; and C) during each of said arbitrations, monitoring the arbitration signals to determine the identity of the arbitration signal indicating the highest priority level among those generated during said cycle of each said arbitration, and, thus identifying the contending commander node of said first and second sets of commander nodes that is to gain control of the system bus to access the resource node.

2. The bus arbitration method in accordance with claim 1, wherein said priority-level assigning step includes the step of assigning a first set of priority levels to said first set of commander nodes, each said commander node of said first set of commander nodes receiving one priority level of said first set of priority levels to use in each said arbitration.

3. The bus arbitration method in accordance with claim 2, wherein said priority-level step further includes the step of changing the priority level of selected ones of said commander nodes of said first set of commander nodes after each arbitration during which any of said commander nodes of said first set of commander nodes generated an arbitration signal.

4. The bus arbitration method in accordance with claim 1, wherein said second set of commander nodes consists of an I/O interface, and said priority-level-assigning step comprises the step of assigning to the I/O interface both a first priority level being higher than all of said first set of priority levels and said second priority level being lower than all of said first set of priority levels.

5. The bus arbitration method in accordance with claim 1, wherein said second set of commander nodes consists of an I/O interface, and said priority-level-assigning step comprises the step of assigning the highest and lowest priority of all of said commander nodes to said I/O interface.

6. The bus arbitration method in accordance with claim 1, further comprising the step of associating each priority level with a signal conductor interconnecting said commander nodes for receiving said arbitration signal, and wherein said arbitration-signal-generating step includes the step of applying the arbitration signals to said signal conductors, and wherein said monitoring step includes the step of monitoring the signal conductors to identify the commander node that is to gain control of the system bus to access the resource node.

7. The bus arbitration method in accordance with claim 6, wherein said second set of commander nodes consists of an I/O interface, and said priority-level-assigning step comprises the step of assigning the highest and lowest priority of all of said commander nodes to said I/O interface.

8. The method in accordance with claim 1, wherein said commander nodes perform said monitoring step.

9. In a data processing system having a plurality of commander nodes and at least one resource node interconnected by a system bus, one or more of said commander nodes contending for control of said system bus to access the resource node during each of a plurality of arbitrations, a bus arbitration apparatus for determining the one of said contending commander nodes that is to gain control of the system bus to access the resource node during each said arbitration, said apparatus comprising A) first means coupled with said commander nodes for assigning priority levels to said commander nodes such that each said commander node of a first set of said commander nodes is assigned a single priority level for each said arbitration, and each commander node of a second set of said commander nodes is assigned more than one priority level for each said arbitration;

B) second means coupled with said first means and with each aid commander node of said first set of commander nodes for generating a first arbitration signal during a predetermined bus cycle of each said arbitration in which said commander node contends for control of said system bus, said arbitration signal indicating the single priority level assigned to that node for said arbitration;

C) third means coupled with said first means and with each said commander node of said second set of commander nodes for generating a second arbitration signal during the same bus cycle during which said contending commander node of said first set of commander nodes generates said first arbitration signal, said second arbitration signal generated by said contending commander node of said second set of commander nodes indicating one of the priority levels assigned to that node; and D) fourth means coupled with said first, second and third means for monitoring the arbitration signals to determine the identity of the arbitration signal indicating the highest priority level among those generated in association with each said arbitration, and, thus, identifying the contending commander node of said first and second sets of commander nodes that is to gain control of the system bus to access the resource node.

10. The bus arbitration apparatus in accordance with claim 9, wherein said priority-level-assigning first means assigns a first set of priority levels to said first set of commander nodes, each commander node of said first set of commander nodes receiving one priority level of said first set of priority levels to use in each said arbitration.

11. The bus arbitration apparatus in accordance with claim 10, wherein said priority-level-assigning first means includes means for assigning a different one of the priority levels to each of a plurality of said commander nodes of said first set of commander nodes after each said arbitration during which any of said commander nodes of said first set of commander nodes generated said arbitration signals.

12. The bus arbitration apparatus in accordance with claim 10, wherein said second set of commander nodes consists of an I/O interface, and said priority-level-assigning first means comprises means for assigning to the I/O interface both a first priority level and a second priority level, said first priority level being higher than all of said first set of priority levels and said second priority level being lower than all of said first set of priority levels.

13. The bus arbitration apparatus in accordance with claim 9, wherein said second set of commander nodes consists of an I/O interface, and said priority-level-assigning first means assigns the highest and lowest priority of all of said commander nodes to said I/O interface.

14. The bus arbitration apparatus in accordance with claim 9, wherein said first means comprises a plurality of signal conductors interconnecting said commander nodes, each of said signal conductors receiving one of said arbitration signals, and wherein each said arbitration-signal-generating second and third means is coupled to said signal conductors for sending the arbitration signals on said signal conductors, and wherein said monitoring fourth means includes means for monitoring the signal conductors to identify the commander node that is to gain control of the system bus to access the resource node.

15. In a data processing system having a plurality of commander nodes and at least one resource node interconnected by a system bus, a bus arbitration technique for determining the commander node contending control for control of said system bus that is to gain control of the system bus to access the resource node, said bus arbitration method comprising the steps of
A) assigning priority levels to said commander nodes, a first set of said commander receiving a single priority level for each said arbitration, and a second set of said commander nodes receiving more than one priority level for each said arbitration;
B) associating each priority level with a signal conductor interconnecting said commander nodes;
C) during each said arbitration, each contending commander node of said first set of commander nodes applying a first arbitration signal during a predetermined bus cycle to the signal conductor associated with the priority level assigned thereto, and each contending commander node of said second set of commander nodes applying a second arbitration signal on the signal conductor associated with one of its priority levels during the same bus cycle during which said contending commander node of said first set of commander nodes applies said first arbitration signal; and
D) said commander nodes monitoring the signal conductors to determine the identity of the contending commander node that applied the arbitration signal to the signal conductor associated with the highest priority level among those that had the arbitration signals applied thereto, and, thus, the identity of the contending commander node of said first and second sets of commander nodes that is to gain control of the system bus to access the resource node.

16. The bus arbitration apparatus in accordance with claim 15, wherein said second set of commander nodes consists of an I/O interface, and said priority-level-assigning step includes the step of assigning the highest and lowest priority of all of said commander nodes to said I/O interface.

17. In a data processing system having a plurality of commander nodes interconnected by a system bus, one or more of said commander nodes contending for control of said system bus during each of a plurality of arbitrations, a bus arbitration apparatus for determining the one of said contending commander nodes that is to gain control of the system bus during each said arbitration, said apparatus comprising:
A) first means associated with each node of a first set of said commander nodes for generating a first arbitration signal during a predetermined bus cycle of each said arbitration during which said node contends for control of said system bus, said first arbitration signal indicating a priority level that is the sole priority level assigned to that node for said first arbitration;
B) second means associated with each said commander node of said second set of commander nodes for generating a second arbitration signal during said bus cycle of each said arbitration during which said node contends for control of said system bus, whereby said first and second arbitration signals are generated during said same bus cycle, said second arbitration signal indicating one of a plurality of priority levels assigned to that node for said arbitration; and
C) third means coupled with said first and second means for monitoring said arbitration signals to determine said arbitration signal that indicates the highest priority level among those generated during each said arbitration, and thus to determine the contending commander node of said first and second sets of commander nodes that is to gain control of said system bus.

18. In a data processing system having a plurality of commander nodes interconnected by a system bus, a bus arbitration apparatus for determining the commander node contending for control of said system bus that is to gain control thereof, said bus arbitration apparatus comprising:
A) a plurality of signal conductors coupled with said commander nodes, each said signal conductors being associated with a different one of a plurality of priority levels, each of a first set of said commander nodes being associated with one and only one of said signal conductors and thus with a single one of said priority levels, and each of a second set of said commander nodes being associated with more than one of said signal conductors, and thus with more than one of said priority levels, each of said signal conductors being associated with only one of said commander nodes;
B) a plurality of first means each coupled with said signal conductors and associated with a corresponding one of said commander nodes of said first set of commander nodes for applying a first arbitration signal to said signal conductor associated with said corresponding commander node during a predetermined bus cycle when said corresponding commander node contends for control of said system bus;
C) at least one second means each coupled with said signal conductors and associated with a corresponding one of said commander nodes of said second set of commander nodes for applying a second arbitration signal to one of said signal conductors associated with said corresponding commander node during said bus cycle when said corresponding commander node contends for control of said system bus, whereby said first and second arbitration signals are applied to said signal conductors during the same bus cycle; and
D) means coupled with said signal conductors for determining the identity of the signal conductor having the highest associated priority level of the signal conductors to which said arbitration signals were applied, and, thus, the identity of the contending commander node of said first and second sets of commander nodes that is to gain control of said system bus.

* * * * *